(12) United States Patent
Wang et al.

(10) Patent No.: US 11,984,819 B2
(45) Date of Patent: May 14, 2024

(54) POWER CONVERSION CIRCUIT, INVERTER, AND CONTROL METHOD

(71) Applicant: Huawei Digital Power Technologies Co., Ltd., Shenzhen (CN)

(72) Inventors: Zhaohui Wang, Nuremberg (DE); Lei Shi, Shanghai (CN); Dong Chen, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 107 days.

(21) Appl. No.: 17/495,117

(22) Filed: Oct. 6, 2021

(65) Prior Publication Data
US 2022/0029555 A1    Jan. 27, 2022

Related U.S. Application Data

(63) Continuation of application No. PCT/CN2019/126910, filed on Dec. 20, 2019.

(30) Foreign Application Priority Data
Apr. 17, 2019    (CN) .......................... 201910310890.9

(51) Int. Cl.
*H02J 3/38* (2006.01)
*H02M 1/12* (2006.01)
(Continued)

(52) U.S. Cl.
CPC ......... *H02M 7/53871* (2013.01); *H02J 3/381* (2013.01); *H02M 1/123* (2021.05); *H02M 1/14* (2013.01); *H02J 2300/24* (2020.01)

(58) Field of Classification Search
CPC .... H02M 7/53871; H02M 1/123; H02M 1/14; H02M 1/0048; H02J 3/381; H02J 2300/24; H02J 3/383; Y02B 70/10; Y02E 10/56
See application file for complete search history.

(56) References Cited

U.S. PATENT DOCUMENTS 8,472,215 B2   6/2013   Koyama et al.
9,048,756 B2   6/2015   Dong et al.
(Continued)

FOREIGN PATENT DOCUMENTS

CN    102204078 A    9/2011
CN    102340258 A    2/2012
(Continued)

OTHER PUBLICATIONS

Ricardo Souza Fiqueredo et al., "Leakage Current Minimization Techniques for Single-Phase Transformerless Grid-Connected PV Inverters—an Overview", 2013 IEEE, total 8 pages.
(Continued)

*Primary Examiner* — Elim Ortiz
(74) *Attorney, Agent, or Firm* — Maier & Maier, PLLC

(57) ABSTRACT

A power conversion circuit includes a switching network, a control circuit, a filter circuit, and a direct current side circuit; and the filter circuit includes a first power inductor, a common mode choke, a first differential mode filter capacitor, a first common mode filter capacitor, and a second common mode filter capacitor. The first power inductor includes a first winding and a second winding, and the common mode choke includes a third winding and a fourth winding; a first end of the first winding and a first end of the second winding are separately connected to the switching network, a second end of the first winding and a second end of the second winding are respectively connected to a first end of the third winding and a first end of the fourth winding.

16 Claims, 8 Drawing Sheets

(51) Int. Cl.
*H02M 1/14* (2006.01)
*H02M 7/5387* (2007.01)

(56) References Cited

U.S. PATENT DOCUMENTS

| | | | |
|---|---|---|---|
| 2012/0275201 A1* | 11/2012 | Koyama | H02M 7/48 |
| | | | 363/40 |
| 2015/0085541 A1 | 3/2015 | Hu et al. | |
| 2018/0205309 A1* | 7/2018 | Bleus | H02M 1/15 |

FOREIGN PATENT DOCUMENTS

| | | |
|---|---|---|
| CN | 102468651 A | 5/2012 |
| CN | 102710159 A | 10/2012 |
| CN | 102714469 A | 10/2012 |
| CN | 103312147 A | 9/2013 |
| CN | 203554276 U | 4/2014 |
| CN | 203691221 U | 7/2014 |
| CN | 203761256 U | 8/2014 |
| CN | 104022673 A | 9/2014 |
| CN | 204615690 U | 9/2015 |
| CN | 106972741 A | 7/2017 |
| CN | 107294464 A | 10/2017 |
| CN | 110148960 A | 8/2019 |
| EP | 3171499 A1 | 5/2017 |
| JP | 2002218656 A | 8/2002 |

OTHER PUBLICATIONS

Zhuang, "Electronic Design Reliability Engineering", Xidian University Press, Sep. 2014 (including English abstract), 22 pages.

* cited by examiner

POWER CONVERSION CIRCUIT, INVERTER, AND CONTROL METHOD

CROSS-REFERENCE TO RELATED APPLICATIONS

This application is a continuation of International Application No. PCT/CN2019/126910, filed on Dec. 20, 2019, which claims priority to Chinese Patent Application No. 201910310890.9, filed on Apr. 17, 2019. The disclosures of the aforementioned applications are hereby incorporated by reference in their entireties.

TECHNICAL FIELD

The embodiments relate to the field of photovoltaic technologies, and in particular, to a power conversion circuit, an inverter, and a hybrid modulation control method.

BACKGROUND

In a grid-connected photovoltaic power generation system, an inverter is a key device, and conversion efficiency and performance of the inverter directly determine a profit of the power generation system.

To reduce costs of the inverter, a non-isolated architecture is used for most current inverters, and a dual-stage relay is used to implement direct grid-connected photovoltaic power generation. However, in a single-phase power grid system, one end of a power grid is usually grounded at a remote end through a transmission line. In this case, a photovoltaic panel, an inverter, and the power grid form a through current loop through the earth. This loop causes a serious leakage current problem.

This leakage current not only causes a personal safety problem, but also increases a loss on the inverter and reduces conversion efficiency of the inverter.

SUMMARY

Embodiments provide a power conversion circuit to improve conversion efficiency of an inverter, and effectively reduce a common mode leakage current. The embodiments further provide a corresponding inverter and a corresponding hybrid modulation control method.

According to a first aspect, a power conversion circuit is provided, and may include:
  a switching network, a control circuit, a filter circuit, a direct current side circuit, and an alternating current side circuit, where
  the switching network is connected to the direct current side circuit, the switching network is connected to the control circuit, the switching network is connected to the filter circuit, and the filter circuit is connected to the alternating current side circuit;
  the control circuit is configured to control the switching network;
  the filter circuit includes a first power inductor, a common mode choke, a first differential mode filter capacitor, a first common mode filter capacitor, and a second common mode filter capacitor;
  the first power inductor includes a first winding and a second winding, and the common mode choke includes a third winding and a fourth winding;
  both a first end of the first winding and a first end of the second winding are separately connected to the switching network, a second end of the first winding is connected to a first end of the third winding, and a second end of the second winding is connected to a first end of the fourth winding;
  two ends of the first differential mode filter capacitor are respectively connected to the second end of the first winding and the second end of the second winding;
  a first end of the first common mode filter capacitor is connected to a second end of the third winding, and a second end of the first common mode filter capacitor is connected to the direct current side circuit by using a low impedance circuit; and
  a first end of the second common mode filter capacitor is connected to a second end of the fourth winding, and a second end of the second common mode filter capacitor is connected to the direct current side circuit by using a low impedance circuit.

The low impedance circuit in a case in which the second end of the first common mode filter capacitor is connected to the direct current side circuit by using the low impedance circuit may be referred to as a first low impedance circuit. The low impedance circuit in a case in which the second end of the second common mode filter capacitor is connected to the direct current side circuit by using the low impedance circuit may be referred to as a second low impedance circuit. The first low impedance circuit and the second low impedance circuit may be a same low impedance circuit, or may be different low impedance circuits.

It can be understood from the first aspect that, before the first differential mode filter capacitor is connected to the common mode choke in the filter circuit, a loss caused when a high-frequency current component flows into the common mode choke can be effectively avoided, thereby improving conversion efficiency of the power conversion circuit. In addition, both the second end of the first common mode filter capacitor and the second end of the second common mode filter capacitor are connected to the direct current side circuit, to provide a low impedance loop of a common mode current, thereby effectively reducing a common mode leakage current from the power conversion circuit to an output port.

In a possible implementation, with reference to the first aspect, in a first possible implementation, the low impedance circuit is a zero impedance circuit, or the low impedance circuit includes one resistor or at least two resistors in series.

In a possible implementation, with reference to the first aspect or the first possible implementation of the first aspect, in a second possible implementation, the filter circuit further includes a second power inductor, the second power inductor includes a fifth winding and a sixth winding, the second end of the third winding is connected to a first end of the fifth winding, the second end of the fourth winding is connected to a first end of the sixth winding, and a second end of the fifth winding and a second end of the sixth winding are connected to the alternating current side circuit.

In a possible implementation, with reference to the first aspect or the first or the second possible implementation of the first aspect, in a third possible implementation, the direct current side circuit includes a positive busbar, a busbar capacitor, and a negative busbar, and two ends of the busbar capacitor are respectively connected to the positive busbar and the negative busbar. In a possible implementation, with reference to the third possible implementation of the first aspect, in a fourth possible implementation, both the second end of the first common mode filter capacitor and the second end of the second common mode filter capacitor are separately connected to the positive busbar. In a possible implementation, with reference to the third possible implementation of the first aspect, in a fifth possible implementation, both the second end of the first common mode filter capacitor and the second end of the second common mode filter capacitor are separately connected to the negative busbar. In a possible implementation, with reference to the third possible implementation of the first aspect, in a sixth possible implementation, the second end of the first common mode filter capacitor is connected to the positive busbar, and the second end of the second common mode filter capacitor is connected to the negative busbar.

In a possible implementation, with reference to the third possible implementation of the first aspect, in a seventh possible implementation, the busbar capacitor includes a positive busbar capacitor and a negative busbar capacitor, a first end of the positive busbar capacitor is connected to the positive busbar, a second end of the positive busbar capacitor is connected to a first end of the negative busbar capacitor, and a second end of the negative busbar capacitor is connected to the negative busbar; and the second end of the first common mode filter capacitor and the second end of the second common mode filter capacitor are connected to a middle point between the positive busbar capacitor and the negative busbar capacitor.

In a possible implementation, with reference to any one of the first aspect or the first to the seventh possible implementations of the first aspect, in an eighth possible implementation:

the switching network includes a first converter bridge arm and a second converter bridge arm, the first converter bridge arm includes a first switching device and a second switching device, and the second converter bridge arm includes a third switching device and a fourth switching device;

the control circuit controls the first switching device and the second switching device of the first converter bridge arm through a first sine modulated wave and a first carrier;

the control circuit controls the third switching device and the fourth switching device of the second converter bridge arm through a second sine modulated wave and a second carrier; and bipolar modulation is performed on the first carrier and the second carrier in a first preset angle range, unipolar modulation is performed in a second preset angle range, the first preset angle range is set based on a direct current bias point of the first sine modulated wave or the second sine modulated wave, the second preset angle range is an angle other than the first preset angle range in a sine wave period of the first sine modulated wave or the second sine modulated wave, and a switching frequency of the bipolar modulation is higher than a switching frequency of the unipolar modulation.

In the eighth possible implementation, a direct current bias means that an alternating current has a direct current component. The sine modulated wave may have one direct current bias point. If a direct current bias value is 0, the direct current bias point is a zero crossing point, or if a direct current bias value is not 0, a value of the direct current bias point is the direct current bias value. It can be understood from the eighth possible implementation that a unipolar and bipolar hybrid modulation scheme is used, to further improve conversion efficiency of the power conversion circuit and further reduce a leakage current.

In a possible implementation, with reference to the eighth possible implementation of the first aspect, in a ninth possible implementation, the first preset angle range includes $(-\alpha, \beta)$, a value of $-\alpha$ and a value of $\beta$ are adjusted based on state information, and the state information includes a voltage of the positive busbar, a voltage of the negative busbar, and a voltage of the alternating current side circuit.

According to a second aspect of the embodiments, a power conversion circuit is provided, and may include:

a switching network, a control circuit, a filter circuit, a direct current side circuit, and an alternating current side circuit, where the switching network is connected to the direct current side circuit, the switching network is connected to the control circuit, the switching network is connected to the filter circuit, and the filter circuit is connected to the alternating current side circuit; the control circuit is configured to control the switching network;

the filter circuit includes a first power inductor, a common mode choke, a first differential mode filter capacitor, a first common mode filter capacitor, and a second common mode filter capacitor;

the common mode choke includes a third winding and a fourth winding;

a first end of the first power inductor is connected to the switching network, a second end of the first power inductor is connected to a first end of the third winding, and a first end of the fourth winding is connected to the switching network;

a first end of the first differential mode filter capacitor is connected to the second end of the first power inductor, and a second end of the first differential mode filter capacitor is connected to the first end of the third winding;

a first end of the first common mode filter capacitor is connected to a second end of the third winding, and a second end of the first common mode filter capacitor is connected to the direct current side circuit by using a low impedance circuit; and a first end of the second common mode filter capacitor is connected to a second end of the fourth winding, and a second end of the second common mode filter capacitor is connected to the direct current side circuit by using a low impedance circuit.

The low impedance circuit in a case in which the second end of the first common mode filter capacitor is connected to the direct current side circuit by using the low impedance circuit may be referred to as a first low impedance circuit. The low impedance circuit in a case in which the second end of the second common mode filter capacitor is connected to the direct current side circuit by using the low impedance circuit may be referred to as a second low impedance circuit. The first low impedance circuit and the second low impedance circuit may be a same low impedance circuit, or may be different low impedance circuits.

It can be understood from the second aspect that, before the first differential mode filter capacitor is connected to the common mode choke in the filter circuit, a loss caused when a high-frequency current component flows into the common mode choke can be effectively avoided, thereby improving conversion efficiency of the power conversion circuit. In addition, both the second end of the first common mode filter capacitor and the second end of the second common mode filter capacitor are connected to the direct current side circuit, to provide a low impedance loop of a common mode current, thereby effectively reducing a common mode leakage current from the power conversion circuit to an output port.

In a possible implementation, with reference to the second aspect, in a first possible implementation, the low impedance circuit is a zero impedance circuit, or the low impedance circuit includes one resistor or at least two resistors in series.

In a possible implementation, with reference to the second aspect or the first possible implementation of the second aspect, in a second possible implementation, the filter circuit further includes a second power inductor, the second power inductor includes a fifth winding and a sixth winding, the second end of the third winding is connected to a first end of the fifth winding, a second end of the fourth winding is connected to a first end of the sixth winding, and a second end of the fifth winding and a second end of the sixth winding are connected to the alternating current side circuit.

In a possible implementation, with reference to the second aspect or the first or the second possible implementation of the second aspect, in a third possible implementation, the direct current side circuit includes a positive busbar, a busbar capacitor, and a negative busbar, and two ends of the busbar capacitor are respectively connected to the positive busbar and the negative busbar.

In a possible implementation, with reference to the third possible implementation of the second aspect, in a fourth possible implementation, both the second end of the first common mode filter capacitor and the second end of the second common mode filter capacitor are separately connected to the positive busbar.

In a possible implementation, with reference to the third possible implementation of the second aspect, in a fifth possible implementation, both the second end of the first common mode filter capacitor and the second end of the second common mode filter capacitor are separately connected to the negative busbar.

In a possible implementation, with reference to the third possible implementation of the second aspect, in a sixth possible implementation, the second end of the first common mode filter capacitor is connected to the positive busbar, and the second end of the second common mode filter capacitor is connected to the negative busbar.

In a possible implementation, with reference to the third possible implementation of the second aspect, in a seventh possible implementation, the busbar capacitor includes a positive busbar capacitor and a negative busbar capacitor, a first end of the positive busbar capacitor is connected to the positive busbar, a second end of the positive busbar capacitor is connected to a first end of the negative busbar capacitor, and a second end of the negative busbar capacitor is connected to the negative busbar; and the second end of the first common mode filter capacitor and the second end of the second common mode filter capacitor are connected to a middle point between the positive busbar capacitor and the negative busbar capacitor.

In a possible implementation, with reference to any one of the second aspect or the first to the seventh possible implementations of the second aspect, in an eighth possible implementation, the switching network includes a first converter bridge arm and a second converter bridge arm, the first converter bridge arm includes a first switching device and a second switching device, and the second converter bridge arm includes a third switching device and a fourth switching device;

the control circuit controls the first switching device and the second switching device of the first converter bridge arm through a first sine modulated wave and a first carrier;

the control circuit controls the third switching device and the fourth switching device of the second converter bridge arm through a second sine modulated wave and a second carrier; and bipolar modulation is performed on the first carrier and the second carrier in a first preset angle range, unipolar modulation is performed in a second preset angle range, the first preset angle range is set based on a direct current bias point of the first sine modulated wave or the second sine modulated wave, the second preset angle range is an angle other than the first preset angle range in a sine wave period of the first sine modulated wave or the second sine modulated wave, and a switching frequency of the bipolar modulation is higher than a switching frequency of the unipolar modulation.

In the eighth possible implementation, a direct current bias means that an alternating current has a direct current component. The sine modulated wave may have one direct current bias point. If a direct current bias value is 0, the direct current bias point is a zero crossing point, or if a direct current bias value is not 0, a value of the direct current bias point is the direct current bias value. It can be understood from the eighth possible implementation that a unipolar and bipolar hybrid modulation scheme is used, to further improve conversion efficiency of the power conversion circuit and further reduce a leakage current.

In a possible implementation, with reference to the eighth possible implementation of the second aspect, in a ninth possible implementation, the first preset angle range includes $(-\alpha, \beta)$, a value of $-\alpha$ and a value of $\beta$ are adjusted based on state information, and the state information includes a voltage of the positive busbar, a voltage of the negative busbar, and a voltage of the alternating current side circuit.

According to a third aspect, a power conversion circuit is provided, and may include:

a switching network, a control circuit, a filter circuit, a direct current side circuit, and an alternating current side circuit, where the switching network is connected to the direct current side circuit, the switching network is connected to the control circuit, the switching network is connected to the filter circuit, and the filter circuit is connected to the alternating current side circuit;

the control circuit is configured to control the switching network;

the filter circuit includes a third power inductor, a fourth power inductor, a common mode choke, a first differential mode filter capacitor, a first common mode filter capacitor, and a second common mode filter capacitor;

the common mode choke includes a third winding and a fourth winding;

a first end of the third power inductor and a first end of the fourth power inductor are separately connected to the switching network, a second end of the third power inductor is connected to a first end of the third winding, and a second end of the fourth power inductor is connected to a first end of the fourth winding;

two ends of the first differential mode filter capacitor are respectively connected to the second end of the third power inductor and the second end of the fourth power inductor;

a first end of the first common mode filter capacitor is connected to a second end of the third winding, and a second end of the first common mode filter capacitor is connected to the direct current side circuit by using a low impedance circuit; and a first end of the second common mode filter capacitor is connected to a second end of the fourth winding, and a second end of the second common mode filter capacitor is connected to the direct current side circuit by using a low impedance circuit.

The low impedance circuit in a case in which the second end of the first common mode filter capacitor is connected to the direct current side circuit by using the low impedance circuit may be referred to as a first low impedance circuit. The low impedance circuit in a case in which the second end of the second common mode filter capacitor is connected to the direct current side circuit by using the low impedance circuit may be referred to as a second low impedance circuit. The first low impedance circuit and the second low impedance circuit may be a same low impedance circuit, or may be different low impedance circuits.

It can be understood from the third aspect that, before the first differential mode filter capacitor is connected to the common mode choke in the filter circuit, a loss caused when a high-frequency current component flows into the common mode choke can be effectively avoided, thereby improving conversion efficiency of the power conversion circuit. In addition, both the second end of the first common mode filter capacitor and the second end of the second common mode filter capacitor are connected to the direct current side circuit, to provide a low impedance loop of a common mode current, thereby effectively reducing a common mode leakage current from the power conversion circuit to an output port.

A difference between the third aspect of this application and the first aspect is that the third power inductor and the fourth power inductor are used to implement functions of the first winding and the second winding. Actually, the first winding and the second winding may also be understood as two power inductors, and the solutions provided in the first aspect and the third aspect are essentially the same.

Other possible implementations of the third aspect may be understood with reference to any possible implementation of the first aspect.

According to a fourth aspect, a hybrid modulation control method is provided. The method is applied to a power conversion circuit, and the power conversion circuit includes a switching network, a control circuit, a filter circuit, a direct current side circuit, and an alternating current side circuit.

The switching network is connected to the direct current side circuit, the switching network is connected to the control circuit, the switching network is connected to the filter circuit, the filter circuit is connected to the alternating current side circuit, the switching network includes a first converter bridge arm and a second converter bridge arm, the first converter bridge arm includes a first switching device and a second switching device, and the second converter bridge arm includes a third switching device and a fourth switching device.

The method includes:

The control circuit controls the first switching device and the second switching device of the first converter bridge arm through a first sine modulated wave and a first carrier.

The control circuit controls the third switching device and the fourth switching device of the second converter bridge arm through a second sine modulated wave and a second carrier.

Bipolar modulation is performed on the first carrier and the second carrier in a first preset angle range, unipolar modulation is performed in a second preset angle range, the first preset angle range is set based on a direct current bias point of the first sine modulated wave or the second sine modulated wave, the second preset angle range is an angle other than the first preset angle range in a sine wave period of the first sine modulated wave or the second sine modulated wave, and a switching frequency of the bipolar modulation is higher than a switching frequency of the unipolar modulation.

It can be understood from the fourth aspect that a unipolar and bipolar hybrid modulation scheme is used, to improve conversion efficiency of the power conversion circuit and reduce a leakage current.

With reference to the fourth aspect, in a first possible implementation, the first preset angle range includes $(-\alpha, \beta)$, a value of $-\alpha$ and a value of $\beta$ are adjusted based on state information, and the state information includes a voltage of a positive busbar, a voltage of a negative busbar, and a voltage of the alternating current side circuit.

According to a fifth aspect, an inverter is provided, and includes the power conversion circuit according to any one of the first aspect or the possible implementations of the first aspect, any one of the second aspect or the possible implementations of the second aspect, or any one of the third aspect or the possible implementations of the third aspect.

According to a sixth aspect, a photovoltaic power generation system is provided, and may include:
a photovoltaic panel, an inverter, and an alternating current network, where
the photovoltaic panel is connected to the inverter, and the inverter is connected to the alternating current network;
the photovoltaic panel is configured to convert light energy into a direct current;
the inverter includes the power conversion circuit according to any one of the first aspect or the possible implementations of the first aspect, any one of the second aspect or the possible implementations of the second aspect, or any one of the third aspect or the possible implementations of the third aspect, and is configured to convert the direct current into an alternating current; and
the alternating current network is configured to transmit the alternating current.

According to a seventh aspect, a computer-readable storage medium. The computer-readable storage medium stores instructions, and when the instructions are run on a computer, the computer is enabled to perform the control method according to the fourth aspect. According to the solutions provided in the embodiments, before the first differential mode filter capacitor is connected to the common mode choke in the filter circuit, the loss caused when the high-frequency current component flows into the common mode choke can be effectively avoided, thereby improving conversion efficiency of the power conversion circuit. In addition, both the second end of the first common mode filter capacitor and the second end of the second common mode filter capacitor are connected to the direct current side circuit, to provide the low impedance loop of the common mode current, thereby effectively reducing the common mode leakage current from the power conversion circuit to the output port.

DETAILED DESCRIPTION OF THE EMBODIMENTS

Embodiments provide a power conversion circuit, to improve conversion efficiency of an inverter, and effectively reduce a common mode leakage current. The embodiments of this application further provide a corresponding inverter and a corresponding hybrid modulation control method.

To make a person of ordinary skill in the art understand solutions in the embodiments better, the following describes the solutions in the embodiments with reference to accompanying drawings. The described embodiments are merely some, rather than all, of the embodiments.

In the embodiments and accompanying drawings, the terms such as "first" and "second" are intended to distinguish between similar objects but do not necessarily indicate a specific order or sequence. It should be understood that the data termed in such a way may be changed in proper circumstances, so that the embodiments described herein can be implemented in other orders than the order illustrated or described herein. In addition, the terms "include" and "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

The embodiments provide a power conversion circuit, an inverter, and a hybrid modulation control method. The power conversion circuit, the inverter, and the hybrid modulation control method may be applied to a scenario architecture shown in FIG. 1.

Figure 1:
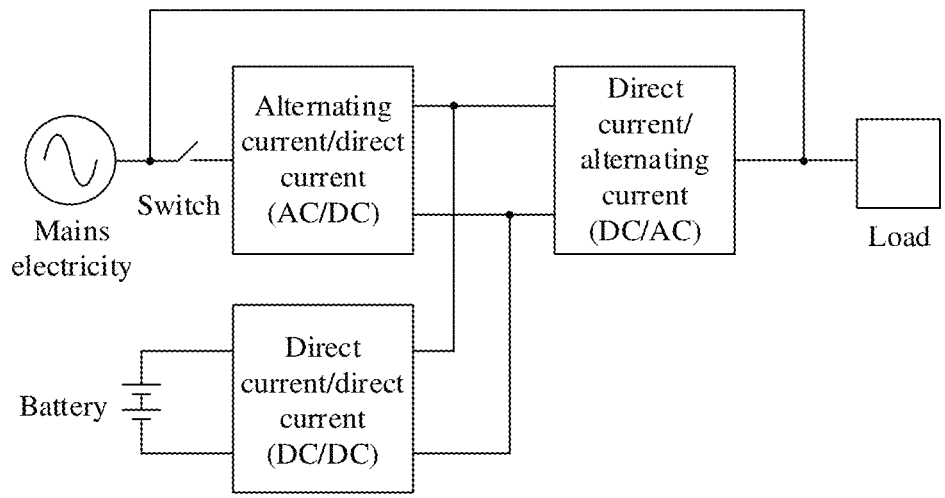
FIG. 1 is a schematic diagram of a scenario to which an embodiment is applied.

FIG. 1 is a schematic diagram of a scenario to which an embodiment is applied.

FIG. 1 shows an architecture of an uninterruptible power system (UPS). In a normal case, mains electricity is used to directly supply power to a load, and power-frequency alternating current mains electricity may pass through a direct current (DC) inverter/an alternating current (AC) inverter to be converted from an alternating current to a direct current, and then pass through a DC/DC converter to charge a battery. When the mains electricity is faulty, the battery supplies power to the load after the DC/DC inverter and the DC/AC inverter convert the direct current into the alternating current. The power conversion circuit and the hybrid modulation control method provided in this application may be applied to a running process of an AC/DC rectifier or a DC/AC inverter.

In another possible scenario, the power conversion circuit, the inverter, and the control method provided in the embodiments may be applied to a grid-connected photovoltaic power generation system.

Figure 2:
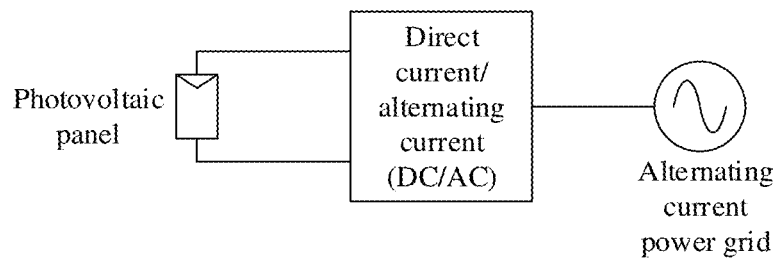
FIG. 2 is a schematic diagram of another scenario to which an embodiment is applied.

FIG. 2 is a schematic diagram of another scenario to which an embodiment is applied.

As shown in FIG. 2, a direct current output by a photovoltaic panel passes through a DC/AC inverter, and the direct current is converted into an alternating current, to implement grid-connected power generation of the photovoltaic panel. The power conversion circuit and the hybrid modulation control method provided in this application may be applied to a running process of the DC/AC inverter.

Based on the foregoing scenarios, the following further describes the solutions by using embodiments.

Figure 3:
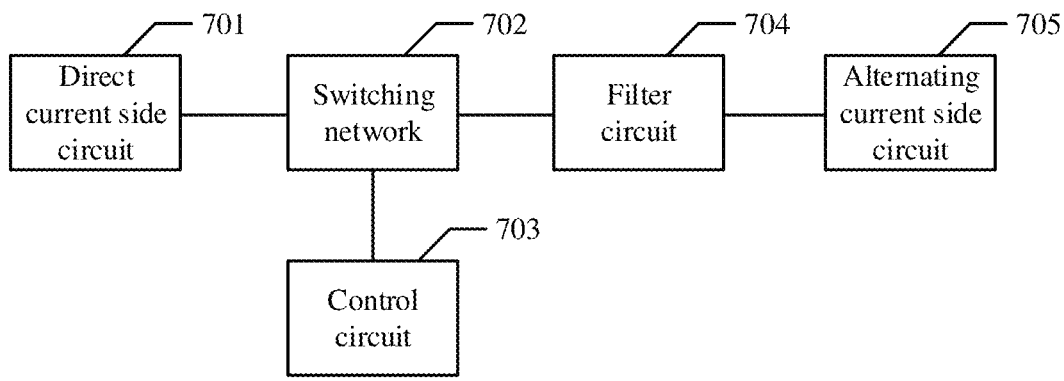
FIG. 3 is a schematic diagram of a power conversion circuit according to an embodiment.

FIG. 3 is a schematic diagram of a power conversion circuit according to an embodiment.

As shown in FIG. 3, the power conversion circuit may include a direct current side circuit 701, a switching network 702, a control circuit 703, a filter circuit 704, and an alternating current side circuit 705.

The switching network 702 is connected to the direct current side circuit 701, the switching network 702 is connected to the control circuit 703, the switching network 702 is connected to the filter circuit 704, and the filter circuit 704 is connected to the alternating current side circuit 705.

The control circuit 703 is configured to control the switching network 702 to convert, into an alternating current according to a preset modulation scheme, a direct current input by the direct current side circuit 701. The filter circuit 704 is configured to: filter out a high-frequency ripple generated by the switching network 702 in a modulation process, and transmit a processed alternating current to the alternating current side circuit 705.

Figure 4:
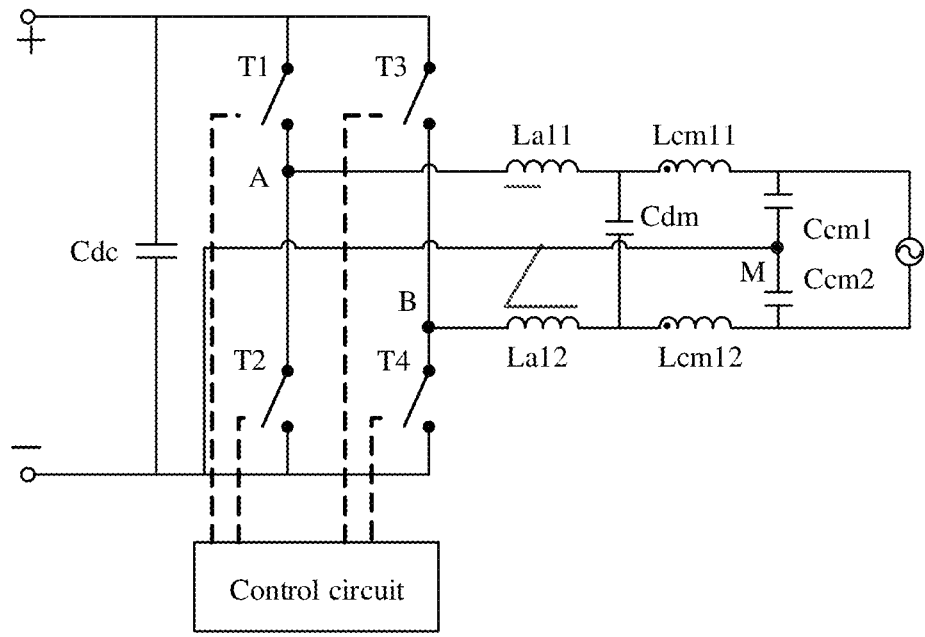
FIG. 4 is a structural diagram of a power conversion circuit according to an embodiment.

In a possible circuit structure, a structural diagram shown in FIG. 4 may be used for the power conversion circuit shown in FIG. 3.

FIG. 4 is a structural diagram of a power conversion circuit according to an embodiment.

The direct current side circuit shown in FIG. 4 includes a positive busbar, a negative busbar, and a busbar capacitor.

The switching network may include a first converter bridge arm and a second converter bridge arm, the first converter bridge arm includes a first switching device T1 and a second switching device T2, and the second converter bridge arm includes a third switching device T3 and a fourth switching device T4.

Optionally, an insulated gate bipolar transistor (IGBT), gallium nitride (GaN), a metal-oxide semiconductor field-effect transistor (, MOSFET), or another power semiconductor device may be selected as the first switching device T1, the second switching device T2, the third switching device T3, and the fourth switching device T4.

The filter circuit may include a first power inductor La1, a common mode choke Lcm, a first differential mode filter capacitor Cdm, and a first common mode filter capacitor Ccm1. In a possible implementation, the filter circuit may further include a second common mode filter capacitor Ccm2.

The first power inductor La1 includes a first winding La11 and a second winding La12. It may be understood that a coil quantity ratio of the first winding La11 to the second winding La12 may be adjusted based on a requirement. In a possible scenario, a same coil quantity may be used. Certainly, a specific coil quantity is determined based on an actual scenario. This is not limited in this embodiment of this application. The common mode choke Lcm includes a third winding Lcm11 and a fourth winding Lcm12.

A first end of the first winding La11 and a first end of the second winding La12 are separately connected to a point A of the switching network, a second end of the first winding La11 is connected to a first end of the third winding Lcm11, and a second end of the second winding La12 is connected to a first end of the fourth winding Lcm12.

A first end of the first differential mode filter capacitor Cdm is connected to the second end of the first winding La11, and a second end of the first differential mode filter capacitor Cdm is connected to the second end of the second winding La12.

A first end of the first common mode filter capacitor Ccm1 is connected to a second end of the third winding Lcm11, and a second end of the first common mode filter capacitor Ccm1 is connected to the direct current side circuit by using a low impedance circuit. In this embodiment, the low impedance circuit may be understood as a conducting wire that is used to directly connect the second end of the first common mode filter capacitor Ccm1 and the direct current side circuit. In this scenario, the low impedance circuit is a zero impedance circuit.

A first end of the second common mode filter capacitor Ccm2 is connected to a second end of the fourth winding Lcm12, and a second end of the second common mode filter capacitor Ccm2 is connected to the direct current side circuit by using a low impedance circuit. In this embodiment, the low impedance circuit may be understood as a conducting wire that is used to directly connect the second end of the second common mode filter capacitor Ccm2 and the direct current side circuit. In this scenario, the low impedance circuit is a zero impedance circuit.

A common mode leakage current is drawn back to the direct current side circuit by using the first common mode filter capacitor Ccm1 and the second common mode filter capacitor Ccm2, to provide a low impedance loop of the common mode leakage current, so that a ground leakage current of an inverter can be significantly reduced. In addition, in a circuit structure shown in FIG. 4, the first power inductor La1 includes the two windings La11 and La12, to provide common mode impedance, reduce impact of a common mode voltage of the inverter, and reduce a required common mode choke.

It should be noted that, in the foregoing solution, the first power inductor La1 may alternatively be only one winding, and does not need to be divided into the first winding and the second winding. In this case, a first end of the first power inductor is connected to the switching network, a second end of the first power inductor is connected to the first end of the third winding, and the first end of the fourth winding is connected to the switching network; and the first end of the first differential mode filter capacitor is connected to the second end of the first power inductor, and the second end of the first differential mode filter capacitor is connected to the first end of the third winding.

Figure 5:
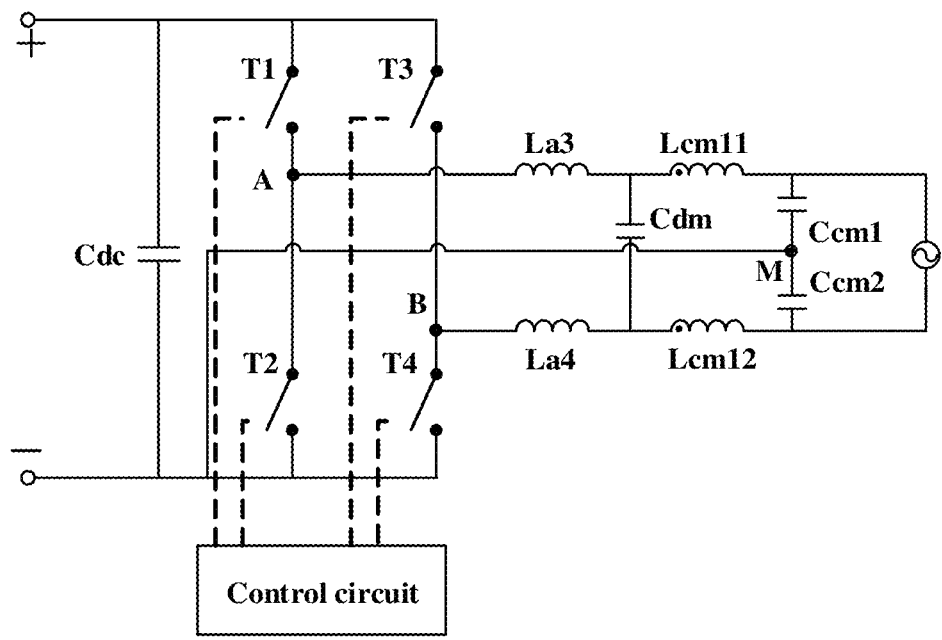
FIG. 5 is a structural diagram of another power conversion circuit according to an embodiment.

Optionally, the first power inductor La1 may alternatively include two independent power inductors, and this may be understood with reference to FIG. 5.

FIG. 5 is a structural diagram of another power conversion circuit according to an embodiment.

In comparison with FIG. 4, in the embodiment shown in FIG. 5, the first power inductor La1 in FIG. 4 is replaced with a third power inductor La3 and a fourth power inductor La4. It may be understood that a coil quantity of the third power inductor La3 and a coil quantity of the fourth power inductor La4 may be selected with reference to the first winding La11 and the second winding La12, or may be adjusted based on a requirement. A specific coil quantity is determined based on an actual scenario.

Optionally, to further reduce impact of a high-frequency ripple from the inverter on an alternating current port, a second power inductor La2 may be further added between the filter circuit and the alternating current side circuit, to provide impedance and reduce impact of the power conversion circuit on the alternating current port. This may be understood with reference to FIG. 6.

Figure 6:
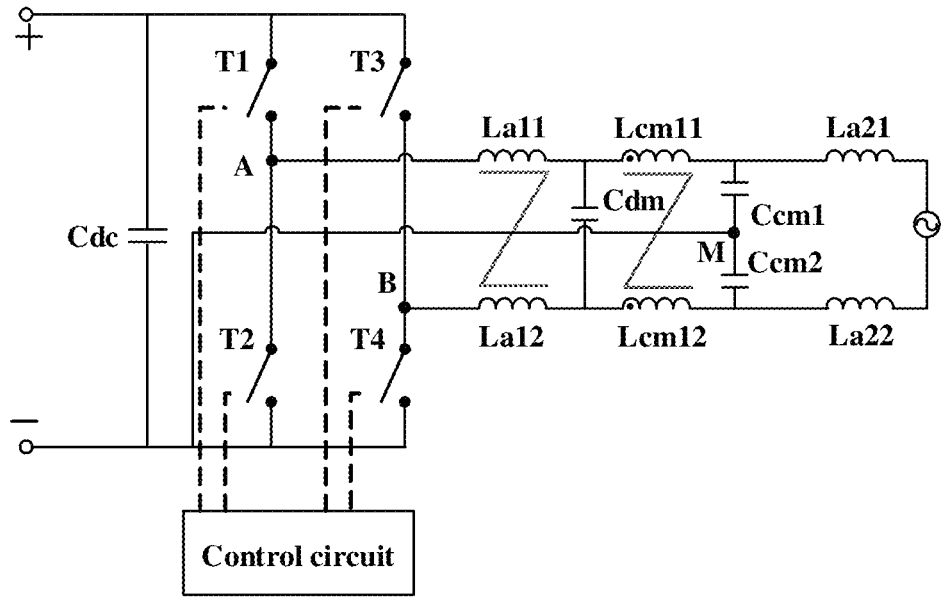
FIG. 6 is a structural diagram of another power conversion circuit according to an embodiment.

FIG. 6 is a structural diagram of another power conversion circuit according to an embodiment.

As shown in FIG. 6, the second power inductor La2 includes a fifth winding La21 and a sixth winding La22, the second end of the third winding Lcm11 is connected to a first end of the fifth winding La21, a second end of the fourth winding Lcm12 is connected to a first end of the sixth winding La22, and a second end of the fifth winding La21 and a second end of the sixth winding La21 are connected to the alternating current side circuit. It may be understood that a coil quantity ratio of the fifth winding La21 to the sixth winding La22 may be adjusted based on a requirement. In a possible scenario, a same coil quantity may be used.

Based on the foregoing circuit, it may be found that, in this embodiment, the common mode leakage current is drawn back to the direct current side circuit by using the first common mode filter capacitor Ccm1 and the second common mode filter capacitor Ccm2, to provide the low impedance loop of the common mode leakage current, so that the ground leakage current of the inverter can be significantly reduced. However, the direct current side circuit that serves as a target to which the common mode leakage current is drawn back includes the positive busbar and the negative busbar. It may be understood that the target to which the common mode leakage current is drawn back may include the following plurality of cases. The cases are described below with reference to accompanying drawings.

It should be noted that changing a case in which the common mode leakage current is drawn back to the direct current side circuit does not affect a solution in which a separate inductor is used as the first power inductor La1 or a solution in which the second power inductor La2 is added between the filter circuit and the alternating current side circuit. In other words, according to the following solutions, the solution in which a separate inductor is used as the first power inductor La1 or the solution in which the second power inductor La2 is added between the filter circuit and the alternating current side circuit may be combined or removed. The following provides descriptions by using the circuit shown in FIG. 6 as an example. A specific circuit change is determined based on an actual scenario, and is not limited herein.

1. The common mode leakage current is drawn back to the negative busbar.

In this embodiment, refer to structural diagrams in FIG. 4 to FIG. 10. Details are not described herein again.

2. The common mode leakage current is drawn back to the positive busbar.

Figure 7:
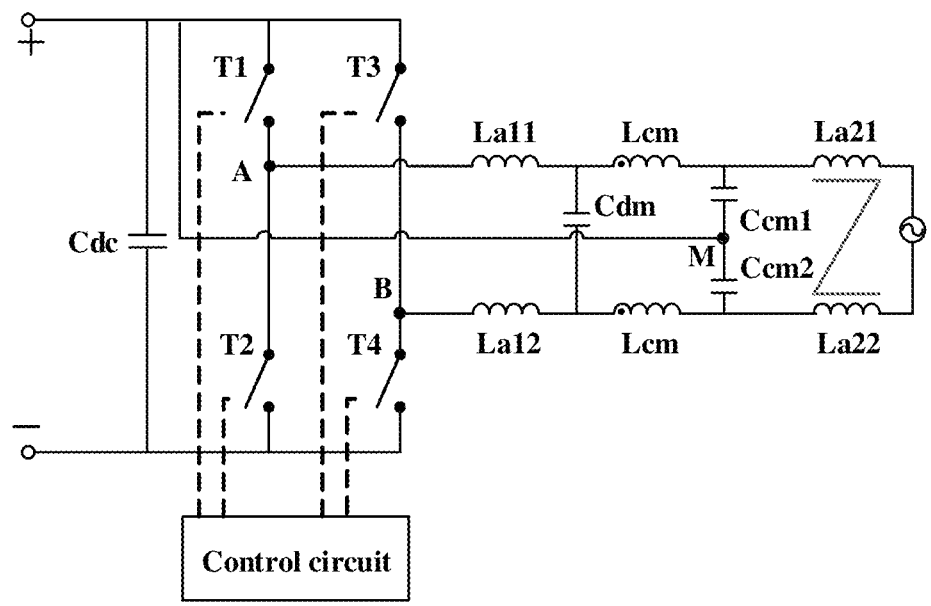
FIG. 7 is a structural diagram of another power conversion circuit according to an embodiment.

In this embodiment, refer to a structural diagram of another power conversion circuit shown in FIG. 7. As shown in FIG. 7, the second end of the first common mode filter capacitor Ccm1 is connected to the positive busbar, and the second end of the second common mode filter capacitor Ccm2 is connected to the positive busbar. Descriptions of other parts may be understood with reference to related content in FIG. 4 to FIG. 10. Details are not described herein again.

3. The common mode leakage current is drawn back to the positive busbar and the negative busbar.

Figure 8:
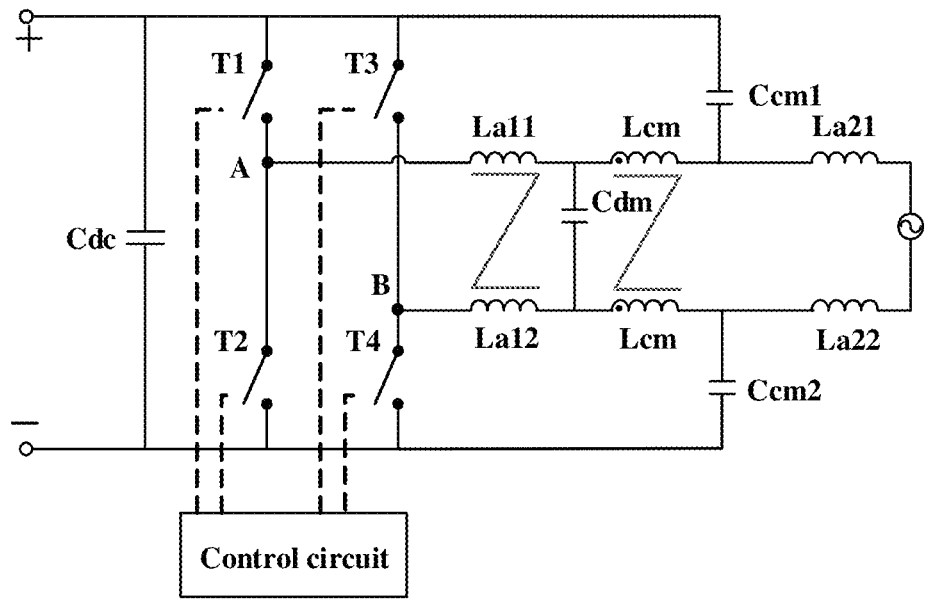
FIG. 8 is a structural diagram of another power conversion circuit according to an embodiment.

In this embodiment, refer to a structural diagram of another power conversion circuit shown in FIG. 8. As shown in FIG. 8, the second end of the first common mode filter capacitor Ccm1 is connected to the positive busbar, and the second end of the second common mode filter capacitor Ccm2 is connected to the negative busbar, so that completely equivalent impedance circuits are provided for the two windings of the common mode choke Lcm, and a one-sided saturation phenomenon is not prone to occur in the common mode choke. Descriptions of other parts may be understood with reference to related content in FIG. 4 to FIG. 10. Details are not described herein again.

4. The common mode leakage current is drawn back to a middle point between the positive busbar and the negative busbar.

Figure 9:
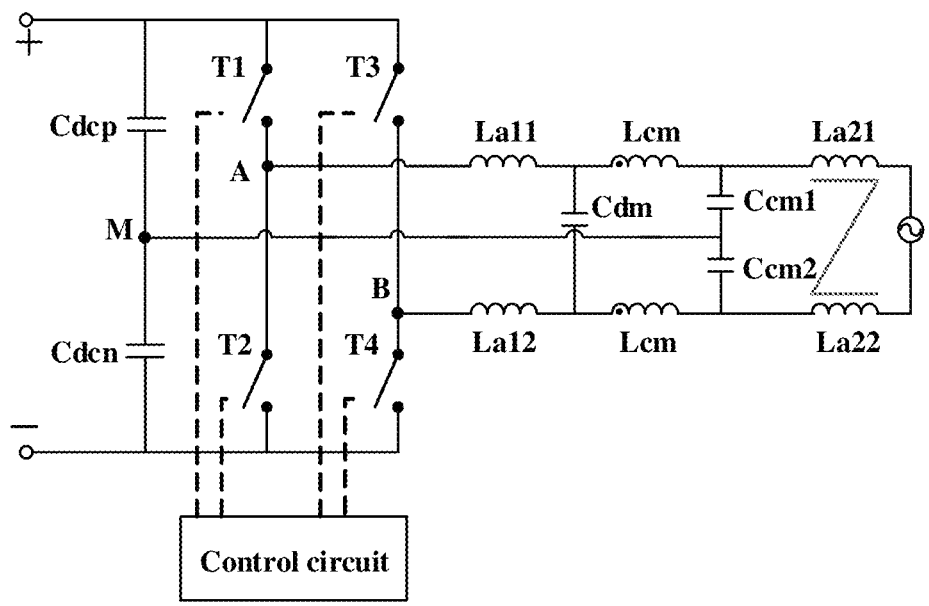
FIG. 9 is a structural diagram of another power conversion circuit according to an embodiment.
Figure 10:
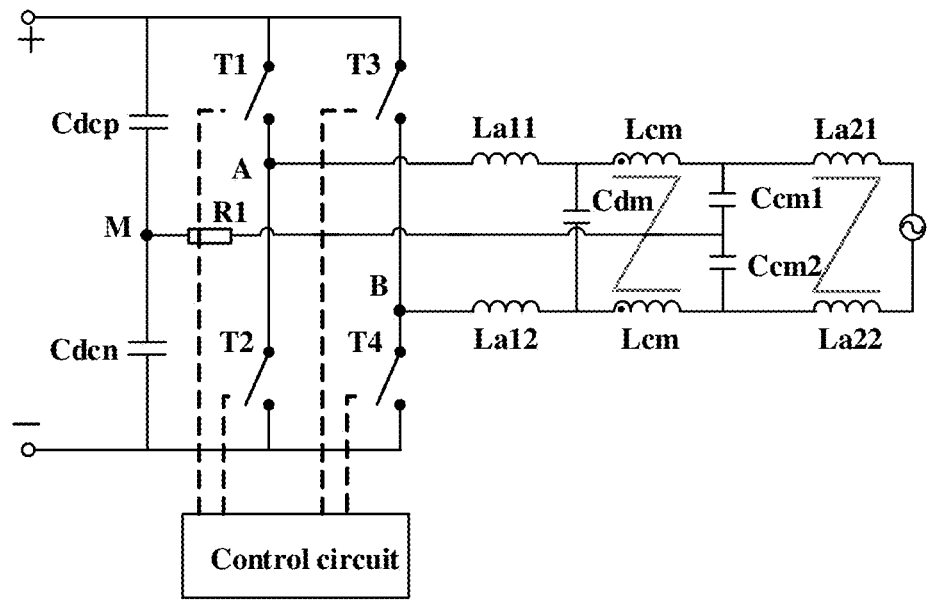
FIG. 10 is a structural diagram of another power conversion circuit according to an embodiment.

In this embodiment, refer to a structural diagram of another power conversion circuit shown in FIG. 9. As shown in FIG. 9, the busbar capacitor Cdc in this embodiment includes a positive busbar capacitor Cdcp and a negative busbar capacitor Cdcn. A first end of the positive busbar capacitor Cdcp is connected to the positive busbar, a second end of the positive busbar capacitor Cdcp is connected to a first end of the negative busbar capacitor Cdcn, a second end of the negative busbar capacitor Cdcn is connected to the negative busbar, and there is a busbar middle point M between the positive busbar capacitor Cdcp and the negative busbar capacitor Cdcn. The second end of the first common mode filter capacitor Ccm1 and the second end of the second common mode filter capacitor Ccm2 are connected to the busbar middle point M, so that a middle point between output common mode capacitors Lcm can be connected to the busbar middle point M. In this filter manner, a low impedance circuit of the common mode leakage current may also be provided, and an output common mode leakage current of the inverter is significantly reduced.

In addition, in this filter manner, completely equivalent impedance circuits are also provided for the two windings of the common mode choke Lcm, and a one-sided saturation phenomenon is not prone to occur in the common mode choke Lcm. Descriptions of other parts may be understood with reference to related content in FIG. 4 to FIG. 10. Details are not described herein again.

Optionally, a low impedance resistor R1 may be connected to a conducting wire for drawing the common mode leakage current back to the direct current side circuit, to serve as a low impedance circuit. As shown in a structural diagram of another power conversion circuit in FIG. 10, a low impedance resistor R1 is connected between the busbar middle point M and the filter circuit. In other words, there is a resistor R1 in the low impedance circuit. The low impedance resistor R1 may provide damping in a common mode loop, to effectively suppress oscillation in the common mode loop. In addition, a parameter of the low impedance resistance R1 may be adjusted based on an actual measurement case, to meet different circuit conditions. Further, in this embodiment, descriptions are provided by using an example in which only one low impedance resistor R1 is added. However, R1 may alternatively be replaced with two or more resistors in series.

It may be understood that a connection of the low impedance resistor R1 may also be applied to the foregoing solutions 1 to 4 of a bus bar connection point. For a specific connection manner, refer to related content in FIG. 10. Details are not described herein again.

In this embodiment, the control circuit needs to control a switching frequency of the switching network according to a control policy, to draw the common mode leakage current back to the direct current side circuit, thereby providing the low impedance circuit of the common mode leakage current, and significantly reducing the ground leakage current of the inverter. The control policy may be based on unipolar modulation, or may be based on unipolar and bipolar hybrid modulation.

Figure 11:
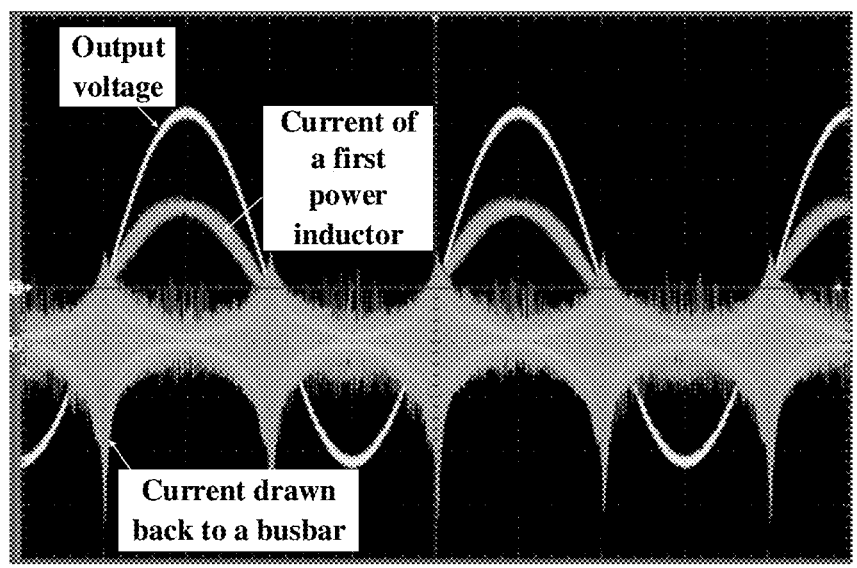
FIG. 11 is a diagram of a waveform of a unipolar modulation-based circuit according to an embodiment.

In a possible scenario based on the unipolar modulation, a waveform shown in FIG. 11 may be obtained through measurement based on the circuit shown in FIG. 6. FIG. 11 is a diagram of a waveform of a unipolar modulation-based circuit according to an embodiment. It can be understood from FIG. 11 that in the foregoing circuit, although the unipolar modulation-based control policy can be used to reduce output power inductance, the unipolar modulation leads to an extremely severe common mode voltage at a zero crossing point of a voltage. The common mode voltage leads to a high voltage second of the common mode choke, a large size of the required common mode choke, and high costs. In addition, the common mode voltage leads to an extremely serious high frequency loss on the common mode choke, and a significant reduction in an advantage of the unipolar modulation.

To use the advantage of the unipolar modulation, and reduce a size of the common mode choke in the provided circuit, an embodiment provides a hybrid modulation control method. The control method is implemented by using the control circuit 703. For example, the control circuit 703 controls the first switching device T1 and the second switching device T2 of the first converter bridge arm through a first sine modulated wave and a first carrier. The control circuit controls the third switching device T3 and the fourth switching device T4 of the second converter bridge arm through a second sine modulated wave and a second carrier.

Figure 12:
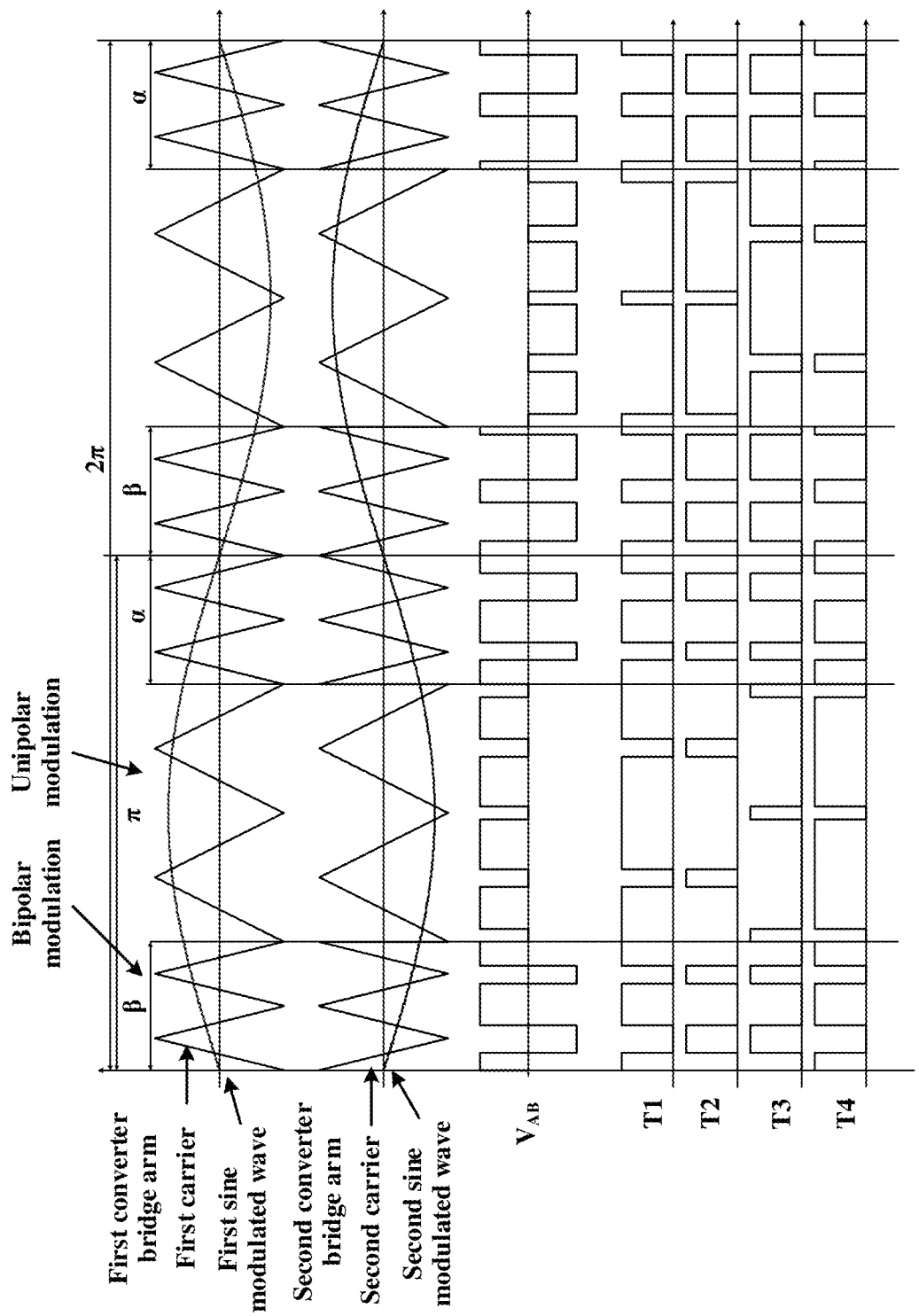
FIG. 12 is a schematic diagram of a waveform of a hybrid modulation control method according to an embodiment.

In this embodiment, the switching frequency of the switching network may be controlled by using a unipolar and bipolar hybrid modulation scheme shown in FIG. 12. FIG. 12 is a schematic diagram of a waveform of a hybrid modulation control method according to an embodiment.

As shown in FIG. 12, bipolar modulation is performed on the first carrier and the second carrier in a first preset angle range ($-\alpha$, $\beta$), and unipolar modulation is performed in a second preset angle range, namely, an angle range obtained after ($-\alpha$, $\beta$) is subtracted from 360 degrees. A period of 360 degrees is used as an example. It may also be understood that the bipolar modulation is used as a modulation scheme in angle ranges ($0-\beta$), (($\pi-\alpha$)$-\pi$). ($\pi-(\pi+\beta)$), and ($2\pi-\alpha$)$-2\pi$), and the unipolar modulation is used in angles ($\beta-(\pi-\alpha)$) and (($\pi+\beta$)$-(2\pi-\alpha)$). The first preset angle range is set based on a direct current bias point of the first sine modulated wave or the second sine modulated wave, the second preset angle range is an angle other than the first preset angle range in a sine wave period of the first sine modulated wave or the second sine modulated wave, a switching frequency of the bipolar modulation is higher than a switching frequency of the unipolar modulation, and the switching frequency of the bipolar modulation is two times of the switching frequency of the unipolar modulation. In some possible scenarios, the frequency of the bipolar modulation may be set to several times of the switching frequency of the unipolar modulation based on a current ripple condition of the first power inductor La1, and a possible range is from three times to 15 times. In the modulation scheme, a smooth transition between the unipolar modulation and the bipolar modulation can be implemented, and a current of a filter inductor is not distorted, so that circuit oscillation and electromagnetic compatibility (EMC) problems caused by a current distortion can be suppressed.

It should be noted that, the direct current bias point may be any value. Descriptions are provided with reference to an experimental measurement scenario by using a zero point as the direct current bias point. In other words, different direct current biases may be obtained based on different experimental scenarios. This is not limited herein. In addition, the first sine modulated wave or the second sine modulated wave that is set at the direct current bias point may be symmetrical. There may be one or more first sine modulated waves or second sine modulated waves, and a specific quantity is determined based on an actual scenario, and is not limited herein.

Optionally, after $\alpha$ and $\beta$ at a current moment are set and control switching in one period is completed, switching between the unipolar modulation and the bipolar modulation may be implemented by adjusting a carrier count frequency and a count change of a counter.

It may be understood that a value of $\alpha$ and a value of $\beta$ are adjusted based on state information. To be specific, $\alpha$ and $\beta$ may be the same or may be different. The state information includes a voltage of the positive busbar, a voltage of the negative busbar, and a voltage of the alternating current side circuit.

Figure 13:
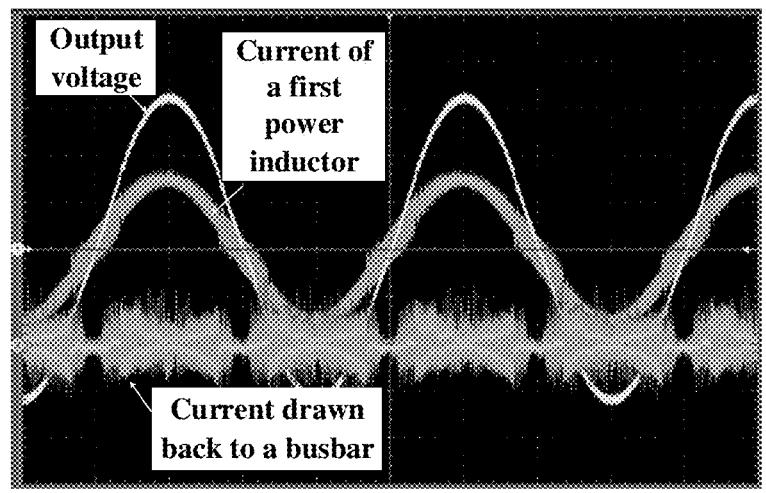
FIG. 13 is a diagram of a waveform of a hybrid modulation-based circuit according to an embodiment.

In a possible scenario, a may be set to 30°, and $\beta$ may be set to 30°. In this case, a waveform shown in FIG. 13 may be obtained through measurement. FIG. 13 is a diagram of a waveform of a hybrid modulation-based circuit according to an embodiment of this application. In comparison with a result shown in FIG. 11, it can be found that an amplitude value of a current drawn back to a busbar obviously decreases at a zero crossing point of an alternating current voltage, and there is no saturation phenomenon. In other words, a same common mode choke cannot meet a normal working requirement of the inverter in a case of the unipolar modulation, but a normal working of the inverter can be ensured in the control method provided in this application. The control method is combined with the circuit structures provided in this application, so that efficiency of the inverter can be significantly improved, a size of a passive device can be reduced, and the common mode leakage current can be effectively controlled.

Figure 14:
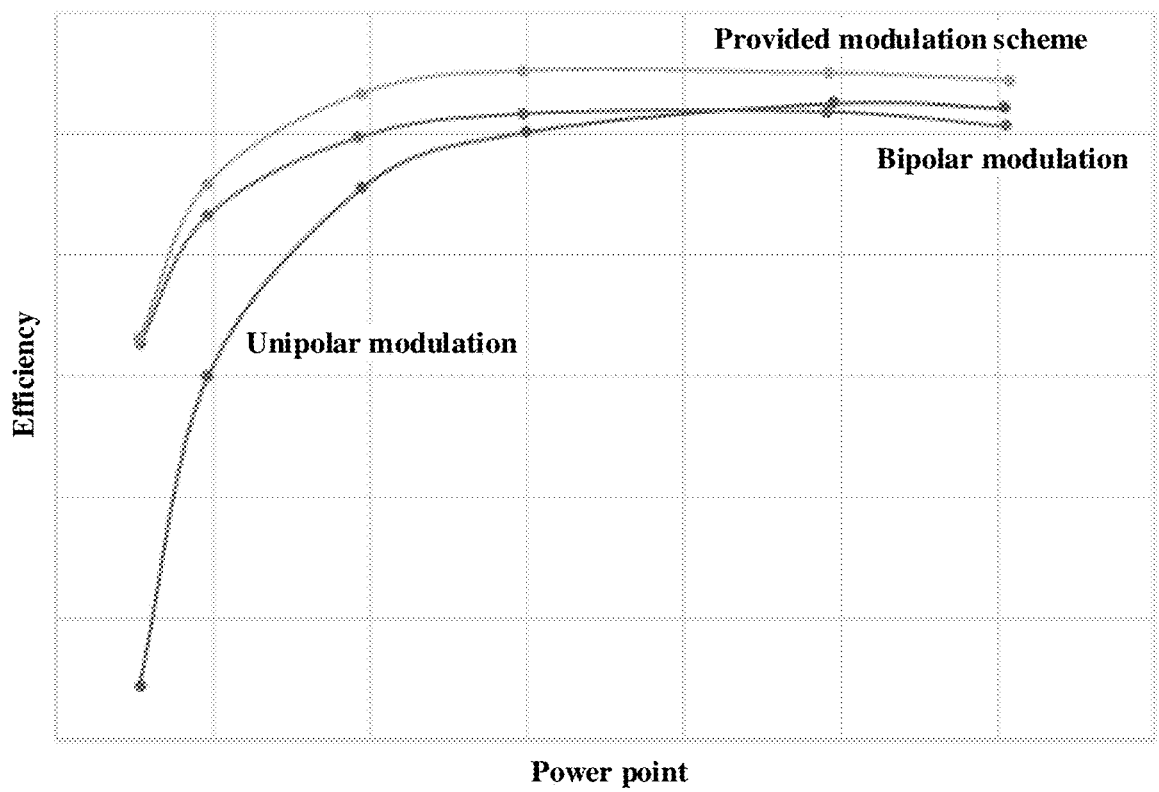
FIG. 14 is a diagram of a comparison between current conversion efficiency in different control manners according to an embodiment.

According to the foregoing control method, FIG. 14 may be obtained. FIG. 14 is a diagram of a comparison between current conversion efficiency in different control manners according to an embodiment. Compared with the bipolar modulation, the unipolar modulation leads to a severe common mode voltage at a zero crossing point of a power-frequency voltage. With a low load, there is an extremely severe high frequency loss on the common mode choke, and relatively low efficiency. With an increase in output power, an advantage in halving a semiconductor switching loss in the unipolar modulation is reflected, and efficiency of the inverter is increased. Curves in FIG. 14 show that in comparison with the unipolar modulation and the bipolar modulation, advantages of the unipolar modulation and the bipolar modulation can be fully used according to a hybrid modulation control policy provided in this embodiment of this application, to not only reduce a semiconductor loss, but also reduce a required common mode choke.

Figure 15:
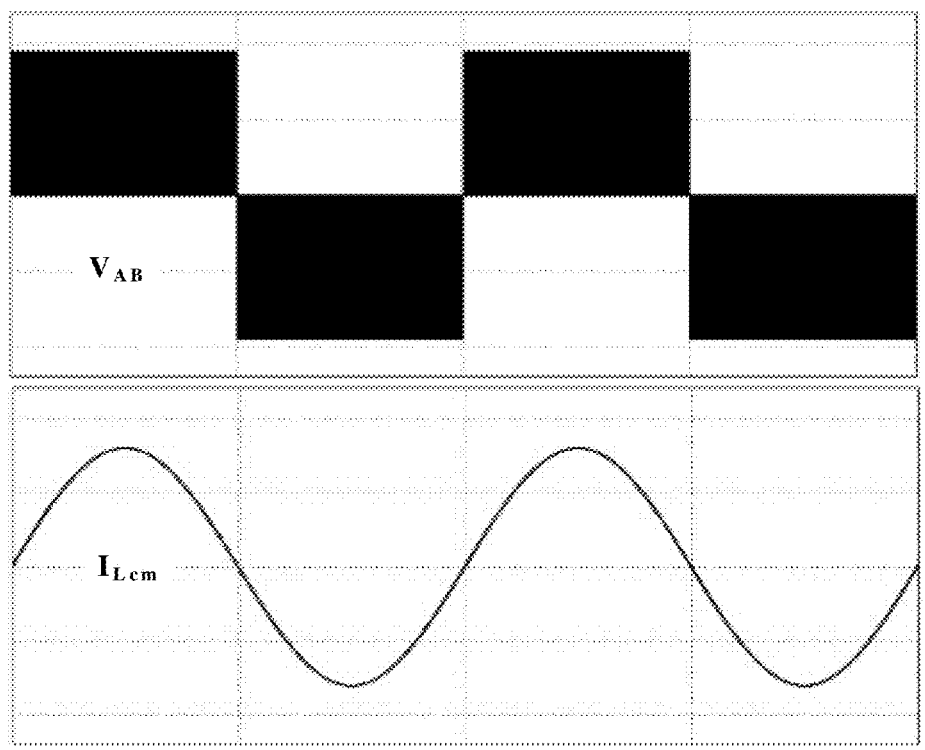
FIG. 15 is a diagram of a waveform of an inverter voltage and a waveform of a current of a common mode choke according to an embodiment.

In a possible scenario, a data diagram shown in FIG. 15 may be obtained based on the circuit in FIG. 6 by using the control method. FIG. 15 is a diagram of a waveform of an inverter voltage and a waveform of a current of a common mode choke according to an embodiment. It can be obviously seen that there is no current with a high-frequency ripple on a winding of the common mode choke of the circuit provided in this application, so that a high-frequency loss on the common mode choke can be reduced, and performance of the inverter is further improved. In addition, the first power inductor La1 and the second power inductor La2 in the circuit structure provided in this application may include two windings, to provide common mode impedance, reduce impact of a common mode voltage of the inverter, and reduce a requirement for the common mode choke.

The inverter provided in this embodiment is a device that includes the foregoing described power conversion circuit. This may be understood with reference to the foregoing descriptions of the power conversion circuit.

A person of ordinary skill in the art may understand that some or all steps of various circuit operations in the foregoing embodiments may be implemented by a program instructing related hardware. The program may be stored in a computer-readable storage medium. The storage medium may include any medium that can store program code, for example, a USB flash drive, a removable hard disk, a read-only memory (ROM), a random access memory (RAM), a magnetic disk, or a compact disc.

The power conversion circuit, the inverter, and the hybrid modulation control method provided in the embodiments are described in detail above. The principle and implementation of the embodiments are described herein through specific examples. The description about the embodiments is merely provided to help understand the method and core ideas of the embodiments. In addition, the person of ordinary skill in the art can make modifications to the specific implementations and application scopes according to the ideas of the embodiments. Therefore the content of the embodiments shall not be construed as limiting.

What is claimed is:

1. A power conversion circuit, comprising:
   a switching network;
   a control circuit configured to control the switching network by using either a first sine modulated wave with a first carrier or a second sine modulated wave with a second carrier;
   a filter circuit comprising a first power inductor comprising a first winding and a second winding, a common mode choke comprising a third winding and a fourth winding, a first differential mode filter capacitor, a first common mode filter capacitor, and a second common mode filter capacitor;
   a direct current side circuit; and
   an alternating current side circuit, wherein the switching network is connected to the direct current side circuit, the control circuit, and the filter circuit, the filter circuit is connected to the alternating current side circuit;
   both a first end of the first winding and a first end of the second winding are separately connected to the switching network, a second end of the first winding is connected to a first end of the third winding, and a second end of the second winding is connected to a first end of the fourth winding;

two ends of the first differential mode filter capacitor are respectively connected to the second end of the first winding and the second end of the second winding;

a first end of the first common mode filter capacitor is connected to a second end of the third winding, and a second end of the first common mode filter capacitor is connected to the direct current side circuit by using a low impedance circuit; and a first end of the second common mode filter capacitor is connected to a second end of the fourth winding, and a second end of the second common mode filter capacitor is connected to the direct current side circuit by using the low impedance circuit, wherein hybrid modulation using both unipolar modulation and bipolar modulation is employed to reduce the common mode choke.

2. The power conversion circuit according to claim 1, wherein the low impedance circuit is a zero impedance circuit, one resistor, or at least two resistors in series.

3. The power conversion circuit according to claim 1, wherein the filter circuit further comprises:

a second power inductor, the second power inductor comprises a fifth winding and a sixth winding, the second end of the third winding is connected to a first end of the fifth winding, the second end of the fourth winding is connected to a first end of the sixth winding, and a second end of the fifth winding and a second end of the sixth winding are connected to the alternating current side circuit.

4. The power conversion circuit according to claim 1, wherein the direct current side circuit further comprises:

a positive busbar, a busbar capacitor, and a negative busbar, and two ends of the busbar capacitor are respectively connected to the positive busbar and the negative busbar.

5. The power conversion circuit according to claim 4, wherein the second end of the first common mode filter capacitor and the second end of the second common mode filter capacitor are connected to the positive busbar.

6. The power conversion circuit according to claim 4, wherein the second end of the first common mode filter capacitor is connected to the positive busbar and the second end of the second common mode filter capacitor is connected to the negative busbar.

7. The power conversion circuit according to claim 4, wherein the busbar capacitor comprises a positive busbar capacitor and a negative busbar capacitor, a first end of the positive busbar capacitor is connected to the positive busbar, a second end of the positive busbar capacitor is connected to a first end of the negative busbar capacitor, a second end of the negative busbar capacitor is connected to the negative busbar, and the second end of the first common mode filter capacitor and the second end of the second common mode filter capacitor are connected to a middle point between the positive busbar capacitor and the negative busbar capacitor.

8. The power conversion circuit according to claim 1, wherein the switching network further comprises:

a first converter bridge arm and a second converter bridge arm, the first converter bridge arm comprises a first switching device and a second switching device, and the second converter bridge arm comprises a third switching device and a fourth switching device, the control circuit controls the first switching device and the second switching device of the first converter bridge arm through the first sine modulated wave and the first carrier; the control circuit controls the third switching device and the fourth switching device of the second converter bridge arm through the second sine modulated wave and the second carrier, and bipolar modulation is performed on the first carrier and the second carrier in a first preset angle range, unipolar modulation is performed in a second preset angle range, the first preset angle range is set based on a direct current bias point of the first sine modulated wave or the second sine modulated wave, the second preset angle range is an angle other than the first preset angle range in a sine wave period of the first sine modulated wave or the second sine modulated wave, and a switching frequency of the bipolar modulation is higher than a switching frequency of the unipolar modulation.

9. The power conversion circuit according to claim 8, wherein the first preset angle range comprises ($-\alpha$, $\beta$), a value of $-\alpha$ and a value of $\beta$ are adjusted based on state information, and the state information comprises a voltage of the positive busbar, a voltage of the negative busbar, and a voltage of the alternating current side circuit.

10. A control method applied to a power conversion circuit comprising a switching network, a control circuit, a filter circuit, a direct current side circuit, and an alternating current side circuit, wherein the switching network is connected to the direct current side circuit, the control circuit, and the filter circuit, the filter circuit is connected to the alternating current side circuit, the switching network comprises a first converter bridge arm and a second converter bridge arm, the first converter bridge arm comprises a first switching device and a second switching device, and the second converter bridge arm comprises a third switching device and a fourth switching device, and the control method comprises:

controlling, by the control circuit, the first switching device and the second switching device of the first converter bridge arm through a first sine modulated wave and a first carrier; and controlling, by the control circuit, the third switching device and the fourth switching device of the second converter bridge arm through a second sine modulated wave and a second carrier;

performing bipolar modulation on the first carrier and the second carrier in a first preset angle range; and performing unipolar modulation in a second preset angle range, wherein the first preset angle range is set based on a direct current bias point of the first sine modulated wave or the second sine modulated wave, the second preset angle range is an angle other than the first preset angle range in a sine wave period of the first sine modulated wave or the second sine modulated wave, and a switching frequency of the bipolar modulation is higher than a switching frequency of the unipolar modulation, and hybrid modulation using both the unipolar modulation and the bipolar modulation is employed to reduce a common mode choke.

11. The control method according to claim 10, wherein the first preset angle range comprises ($-\alpha$, $\beta$), a value of $-\alpha$ and a value of $\beta$ are adjusted based on state information, and the state information comprises a voltage of the positive busbar, a voltage of a negative busbar, and a voltage of the alternating current side circuit.

12. A photovoltaic power generation system, comprising:

a photovoltaic panel configured to convert light energy into a direct current;

an inverter configured to convert the direct current into an alternating current; and an alternating current network configured to transmit the alternating current, wherein the photovoltaic panel is connected to the inverter, and the inverter is connected to the alternating current network; the inverter comprises the power conversion circuit; wherein the power conversion circuit comprises:

a switching network, a control circuit configured to control the switching network by using either a first sine modulated wave with a first carrier or a second sine modulated wave with a second carrier, a filter circuit comprising a first power inductor comprising a first winding and a second winding, a common mode choke comprising a third winding and a fourth winding, a first differential mode filter capacitor, a first common mode filter capacitor, and a second common mode filter capacitor, a direct current side circuit, and an alternating current side circuit, wherein the switching network is connected to the direct current side circuit, the switching network is connected to the control circuit, the switching network is connected to the filter circuit, and the filter circuit is connected to the alternating current side circuit; the control circuit is configured to control the switching network;

both a first end of the first winding and a first end of the second winding are separately connected to the switching network, a second end of the first winding is connected to a first end of the third winding, and a second end of the second winding is connected to a first end of the fourth winding; and two ends of the first differential mode filter capacitor are respectively connected to the second end of the first winding and the second end of the second winding, wherein hybrid modulation using both unipolar modulation and bipolar modulation is employed to reduce the common mode choke.

13. The system according to claim 12, wherein a first end of the first common mode filter capacitor is connected to a second end of the third winding, a second end of the first common mode filter capacitor is connected to the direct current side circuit by using a low impedance circuit, a first end of the second common mode filter capacitor is connected to a second end of the fourth winding, a second end of the second common mode filter capacitor is connected to the direct current side circuit by using the low impedance circuit, and the low impedance circuit is a zero impedance circuit, one resistor, or at least two resistors in series.

14. The system according to claim 13, wherein the filter circuit further comprises:

a second power inductor, the second power inductor comprises a fifth winding and a sixth winding, the second end of the third winding is connected to a first end of the fifth winding, the second end of the fourth winding is connected to a first end of the sixth winding, and a second end of the fifth winding and a second end of the sixth winding are connected to the alternating current side circuit.

15. The system according to claim 13, wherein the direct current side circuit further comprises:

a positive busbar, a busbar capacitor, and a negative busbar, and two ends of the busbar capacitor are respectively connected to the positive busbar and the negative busbar.

16. The system according to claim 15, wherein the second end of the first common mode filter capacitor and the second end of the second common mode filter capacitor are connected to the positive busbar.

* * * * *